United States Patent Office 3,170,944
Patented Feb. 23, 1965

3,170,944
HALOACETONYL PHOSPHONATES AND A
METHOD OF PREPARING THEM
Karoly Szabo, Pleasantville, N.Y., assignor to Stauffer
Chemical Company, New York, N.Y., a corporation of
Delaware
No Drawing. Filed Nov. 20, 1962, Ser. No. 239,040
8 Claims. (Cl. 260—461)

This invention relates to a new class of organophosphorus compounds characterized by the presence of an organophosphorus residue in the alpha position of a halogenated acetone. The invention also pertains to a novel reaction whereby the aforesaid organophosphorus compounds can be obtained.

It is known that phosphites react with alkyl halides to form primary phosphonate esters. This reaction, which is commonly referred to as the Arbuzov condensation, can be carried out with a wide choice of reactants. In fact, the reaction takes place using any trivalent phosphorus derivative provided the latter carries at least one —OR ester group. Nor is the structure of the organic halide critical, although the halogen must not be bound directly an an aromatic nucleus. Generally, primary aliphatic halides react most readily whereas the tertiary series have proven to be the least reactive. Polyhalides also undergo the reaction, each halogen being converted to an ester function, thereby yielding an organophosphorus derivative having a plurality of phosphoric ester groupings. For a more extensive review of the Arbuzov reaction, reference is made to the well-known text, "Organophosphorus Compounds" by Gennady M. Kosolopoff.

As above pointed out, the Arbuzov condensation takes place with a large selection of reactants. There is, however, a notable and unusual exception to the Arbuzov reaction when an alpha-halogenated ketomethylene compound is employed as the organic halide component. In such instances, there is not obtained the usual phosphonate derivative. Instead there is formed a phosphate type of structure in which one of the esterifying moieties is derived from the aforesaid halogenated ketomethylene compound. Thus, in the case of chloroacetone, the product is a phosphate in which one of the ester groups is an isopropenyl radical provided by the chloroacetone reactant. Deviations from the normal Arbuzov condensation using an alpha-halogenated ketomethylene as the organic halide is commonly referred to as the Perkov reaction. It is well known in organophosphorus art and is spelled out in greater detail in the chemical and technical literature to which reference is made.

With a view to preparing new and novel organophosphorus esters via the Perkov reaction, sym. dichlorotetrafluoroacetone was condensed with a wide choice of tertiary phosphorus derivatives all of which were characterized by the presence of at least one —OR ester function. Typically, a trialkyl phosphite was reacted with the aforesaid alpha-chlorinated ketone in order to obtain an organic phosphate having as one of the esterifying moieties a chlorotetrafluoroisopropenyl radical. The reaction should normally proceed as depicted in the following equation:

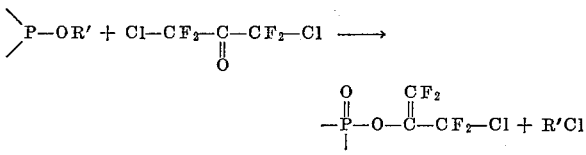

However, subsequent analytical data revealed that the reactants had not undergone the Perkov condensation but had instead followed the Arbuzov route, i.e. a phosphonate type of structure was formed in which the phosphorus atom was linked directly to the alpha carbon atom of the halogenated ketone. Such anomalous behavior of sym. dichlorotetrafluoroacetone, which obviously can be regarded as an active halogenated ketomethylene compound, is indeed unusual. This is particularly puzzling since a closely related derivative, sym. dichloroacetone, reacts with tertiary organic phosphorus components via the expected Perkov mechanism resulting in a phosphate type of product in which one of the esterfying functions contains a chloroisopropenyl radical corresponding generally to the following configuration:

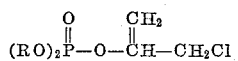

The resulting chloroisopropenyl organic phosphate can be made to react further with an organic phosphite and in this case it reacts as a typical alkyl halide and engenders a typical Arbuzov type of product, i.e. a phosphonate. There is thus obtained a bis organophosphorus ester characterized by the presence of two ester moieties, i.e. a phosphate function on the one hand, and a phosphonate on the other.

Although I have not as yet been able to account for the anomalous behavior of the fully halogenated ketone, it is presumed the presence of the fluorine modified the electron density on the α-carbon atoms thereby favoring the Arbuzov mechanism.

I have reacted numerous representatives of tertiary organophosphorus compounds having at least one lower —OR ester grouping with sym. dichlorotetrafluoroacetone and in all instances it was observed that the action proceeds via the Arbuzov route; no evidence was found indicating that a Perkov rearrangement occurred.

New and novel organophosphorus esters which can be obtained by my hitherto unknown synthetic method can be formalistically depicted as follows:

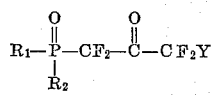

wherein $R_1$ and $R_2$, which may be alike or different, each represent an alkyl radical of from 1 to 10 carbon atoms, e.g. methyl, ethyl, 2-chloroethyl, 2-bromoethyl, n-propyl, isopropyl, 3-methoxypropyl, 3-ethoxypropyl, n-butyl, sec.-butyl, isobutyl, n-pentyl, isohexyl, n-heptyl, isooctyl, n-octyl, n-nonyl, and n-decyl; cycloalkyl such as cyclopentyl or cyclohexyl; an aromatic hydrocarbon radical of the benzene and naphthalene series, e.g. phenyl, toluyl, p-nitrophenyl, halogenated phenyl such as p-chlorophenyl, p-bromophenyl, 2,4-dichlorophenyl and the like, lower alkoxyphenyl such as p-methoxyphenyl, p-ethoxyphenyl and the like, 1-naphthyl, 2-naphthyl, 4-chloro-1-naphthyl and the like; an aralkyl radical wherein the aryl ring belongs to the benzene and naphthalene series and the alkyl position is lower alkyl as illustrated by benzyl, p-chlorobenzyl, p-bromobenzyl, p-nitrobenzyl, phenethyl, 3-phenylpropyl, 1-naphthylmethyl, 2-naphthylmethyl, etc., lower alkylated amino; an alkoxyl of from 1 to 10 carbon atoms such as methoxy, ethoxy, n-propoxy, n-butoxy, n-pentoxy, n-hexoxy, isooctaxy, n-decoxy, and the like and Y stands for chlorine or the radical

wherein $R_1$ and $R_2$ have the designation as above set forth.

Compounds falling within the ambit of the general formula are structurally depicted below:
Compound 1:
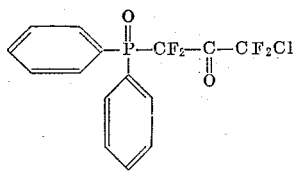
Compound 2:
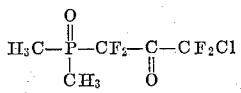
Compound 3:
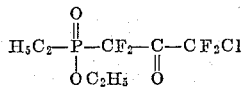
Compound 4:
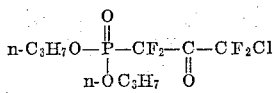
Compound 5:
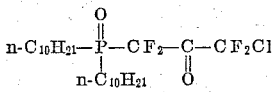
Compound 6:
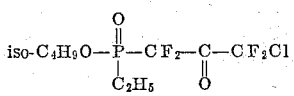
Compound 7:
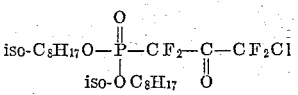
Compound 8:
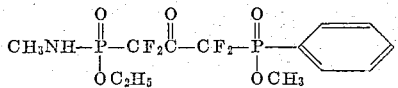
Compound 9:
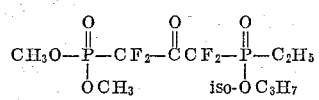
Compound 10:
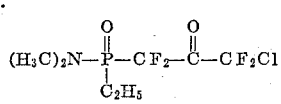
Compound 11:
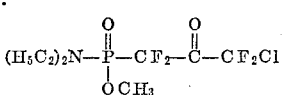
Compound 12:
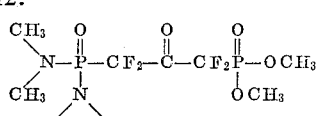
Compound 13:
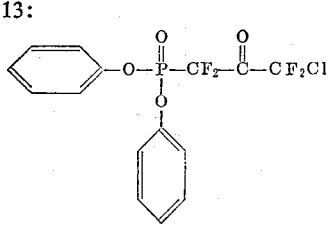
Compound 14:
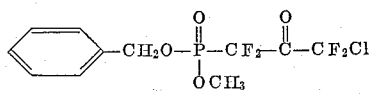
Compound 15:
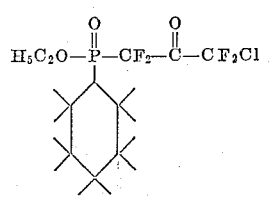
Compound 16:
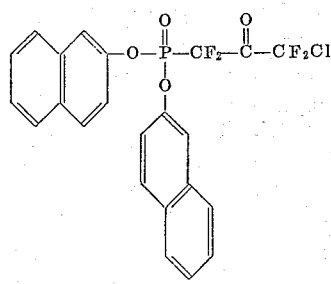
Compound 17:
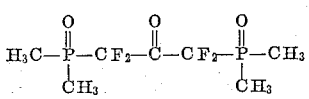
Compound 18:
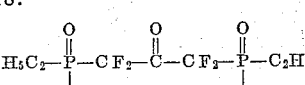
Compound 19:
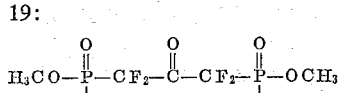
Compound 20:
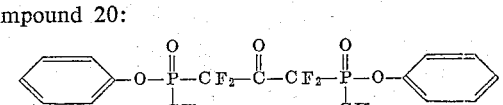
Compound 21:
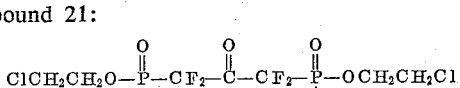
Compound 22:
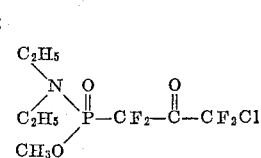
Compound 23:
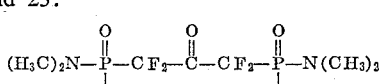
Compound 24:
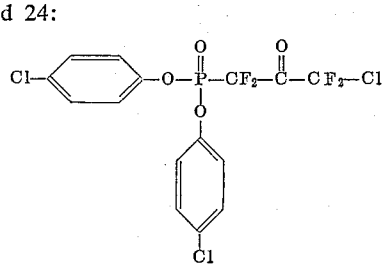

Compound 25:

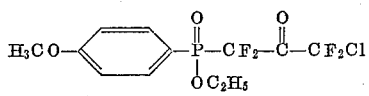

In obtaining the organophosphorus esters of the invention, it is necessary to use one mole of the organophosphorus tertiary derivative per chlorine atom in the sym. dichlorotetrafluoroacetone. Thus, in the event it is desired to replace both chlorine atoms, it is necessary to employ two moles of the phosphite reactant. The course of the reaction is schematically depicted in the equation below:

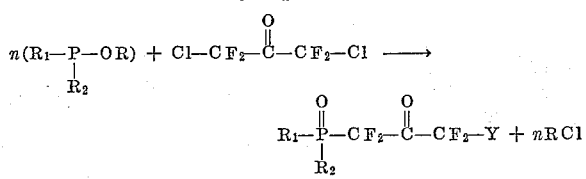

wherein R is lower alkyl, hydrogen, or an alakli metal such as sodium, potassium, lithium, etc., $n$ is an integer of from 1 to 2, and $R_1$, $R_2$ and Y have the significance as above designated.

In general, it has been ascertained that excellent results are achieved by reacting the components in the presence of an inert solvent such as an aliphatic saturated hydrocarbon or aromatic hydrocarbon. The solvents are preferably liquid under the reaction conditions. Specific examples of suitable solvents include hexane, heptane, octane, Stoddard solvent, benzene, toluene, xylene and the like. The reaction product is conveniently purified by distillation and is normally obtained as a colorless oil.

The tertiary organic phosphorus compounds which are used as intermediates in practicing the process of the invention are well known in the art and the chemical literature bounds with intermediates of this type. The sym. dischlorotetrafluoroacetone is likewise a known compound.

Another novel and unexpected feature of the process contemplated herein concerns the utility of a trivalent phosphorus intermediate having a free acidic or OH function. As hitherto practiced such intermediates, unless used in the form of their alkali metal salts, would not undergo the Michaelis-Arbuzov condensation. However, as can be seen from the previous discussion, such acid trivalent phosphorus compounds react readily with the sym. dichlorotetrafluoroacetone.

Reference is now made to the following examples which are inserted for the purpose of illustrating the various processes and products described herein. However, such examples are for the purpose of illustration only and those skilled in the art will appreciate that various modifications of the invention can be practiced without departing from the scope or spirit thereof.

*Example 1*

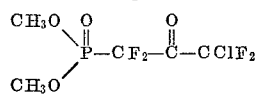

19.9 g. (0.1 mole) of sym. dichlorotetrafluoroacetone in 70 ml. of benzene was placed in a 3-necked round bottom flask equipped with a stirrer, reflux condenser, dropping funnel and thermometer, and 11 g. of dimethylphosphite was introduced dropwise from the dropping funnel. A spontaneous reaction occurred and external cooling was necessary in order to maintain the internal temperature below about 40° C. After most of the dimethylphosphite had been added, the temperature began dropping after which the reaction was refluxed at 85° C. for one hour. The reaction mixture was then subjected to distillation and there was obtained 15.5 g. of a colorless oil boiling at 85–90° C. at 18 mm. and having an $N_D^{25}$ of 1.3854. The infrared data and elemental analysis was in conformity with the above depicted structure.

*Example 2*

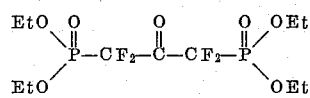

This reaction was carried out in essence in the same manner as that given for Example 1 except in this instance triethylphosphite was used in lieu of the dimethylphosphite of the first example. In general, the results and yield paralleled those obtained in the case of Example 1. After purification by distillation, there was obtained 30 g. of a colorless oil boiling at 154° C. at 1.5 mm. and having an $N_D^{25}$ of 1.4086. The analytical values and infrared data substantiated the structure as above illustrated.

*Example 3*

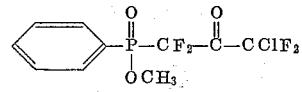

Using the procedure as given in the previous examples, 17.0 g. (0.1 mole) of dimethylphenylphosphonite was reacted with 19.9 g. (0.1 mole) of sym. dichlorotetrafluoroacetone and 100 ml. of benzene. There was obtained 86% of a product distilling at 102° C. at 2.5 mm. and having an $N_D^{25}$ of 1.4635. Analytical data was in consonance with the above depicted structure.

*Example 4*

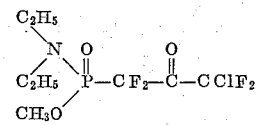

Using the method set forth in the previous examples, 16.5 g. (0.1 mole) of diethyl-N,N-diethylphosphonoamidite was added to a mixture of 19.9 g. (0.1 mole) of sym. dichlorotetrafluoroacetone and 70 ml. of benzene. The contents of the reaction vessel were maintained at 18° C. during the addition after which the temperature was allowed to rise to room temperature. After remaining overnight, the mixture was distilled and the fraction collected boiling at 75–76° C. at 0.7 mm. The purified product was obtained in a yield of 89% and the $N_D^{25}$ was 1.4045. The analytical data was in agreement with the structure as above depicted.

The organophosphorus esters of the present invention represent new and useful chemical substances. The compounds have been found to exhibit a wide range of biocidal activity and are effective against plant and lower animal pests such as insects, mites, and the like. Especially useful in this connection are those derivatives in which the phosphorus atom has attached thereto phenyl, lower alkoxy, lower alkyl or amino radicals, such as lower alkylated amino radicals or the like. These especially reactive compounds can be generally represented by the following formula:

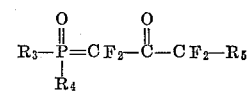

wherein $R_3$ and $R_4$ can be a lower alkyl radical, a lower alkoxy radical, phenyl, an amino radical, e.g. alkylated-amino, and $R_5$ can be chlorine or

wherein $R_3$ and $R_4$ have the designation as above set forth.

Thus, the compound of Example 2 was useful in controlling rust and mildew on bean plants and in this connection it was found to be effective at a concentration of 25 p.p.m. The compound was also capable of herbicidal activity and in this connection wild oats, foxtail, smuts grass were especially susceptible when treated with pre-emergent applications of the compound of Example 2. Lower pest organisms could also be controlled when contacted with sprays containing as their active component the compound of Example 2. For instance, a spray concentration of 0.1% of compound gave 100% kill of the mites (Tetranychus) and 90% kill of the flies. In the case of *Tribolium confusum* (confused flour beetle) a .1% solution of the compound of Example 2 resulted in 100% kill.

Selective post-emergent herbicide activity was also exhibited by the compound of Example 2 and in this connection mustard and crab grass proved to be most susceptible.

I claim:
1. An organophosphorus compound of the following formula:

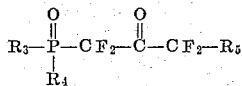

wherein $R_3$ and $R_4$ are selected from the class consisting of phenyl, lower alkyl, lower alkoxy, amino, lower alkylated amino and phenyl amino, and $R_5$ is selected from the class consisting of chlorine and

wherein $R_3$ and $R_4$ have the aforesaid values.

2. An organophosphorus compound of the formula:

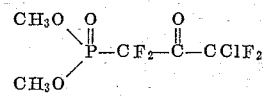

3. An organophosphorus compound of the formula:

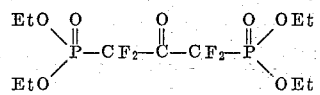

4. An organophosphorus compound of the formula:

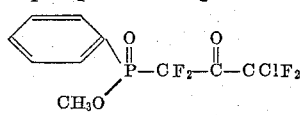

5. An organophosphorus compound of the formula:

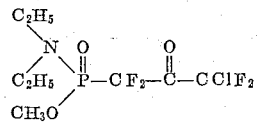

6. A method of preparing an organophosphorus compound of the following general formula:

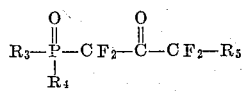

wherein $R_3$ and $R_4$ are selected from the class consisting of phenyl, lower alkyl, lower alkoxy, amino, lower alkylated amino and phenylamino and $R_5$ is selected from the class consisting of chlorine and

wherein $R_3$ and $R_4$ have the values as above designated which comprises reacting a tertiary organophosphorus intermediate of the following formula

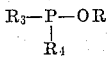

wherein $R_3$ and $R_4$ have the values as above given and R is selected from the class consisting of hydrogen, an alkali metal and lower alkyl, with sym. dichlorotetrafluoroacetone, it being understood that one mole of the trivalent organophosphorus intermediate is used per atom of chlorine replaced.

7. The process according to claim 6 wherein the reaction is carried out in the presence of a liquid hydrocarbon solvent.

8. The process according to claim 7 wherein the hydrocarbon solvent is benzene.

References Cited in the file of this patent

UNITED STATES PATENTS

| 2,956,919 | Baker et al. | Oct. 18, 1960 |
| 3,070,490 | Saul et al. | Dec. 25, 1962 |

FOREIGN PATENTS

| 1,066,923 | France | Jan. 27, 1954 |